April 10, 1934.  E. A. ROCKWELL  1,953,989
INCLOSED DISK TYPE POWER BRAKE UNIT
Original Filed Jan. 18, 1930   3 Sheets-Sheet 1
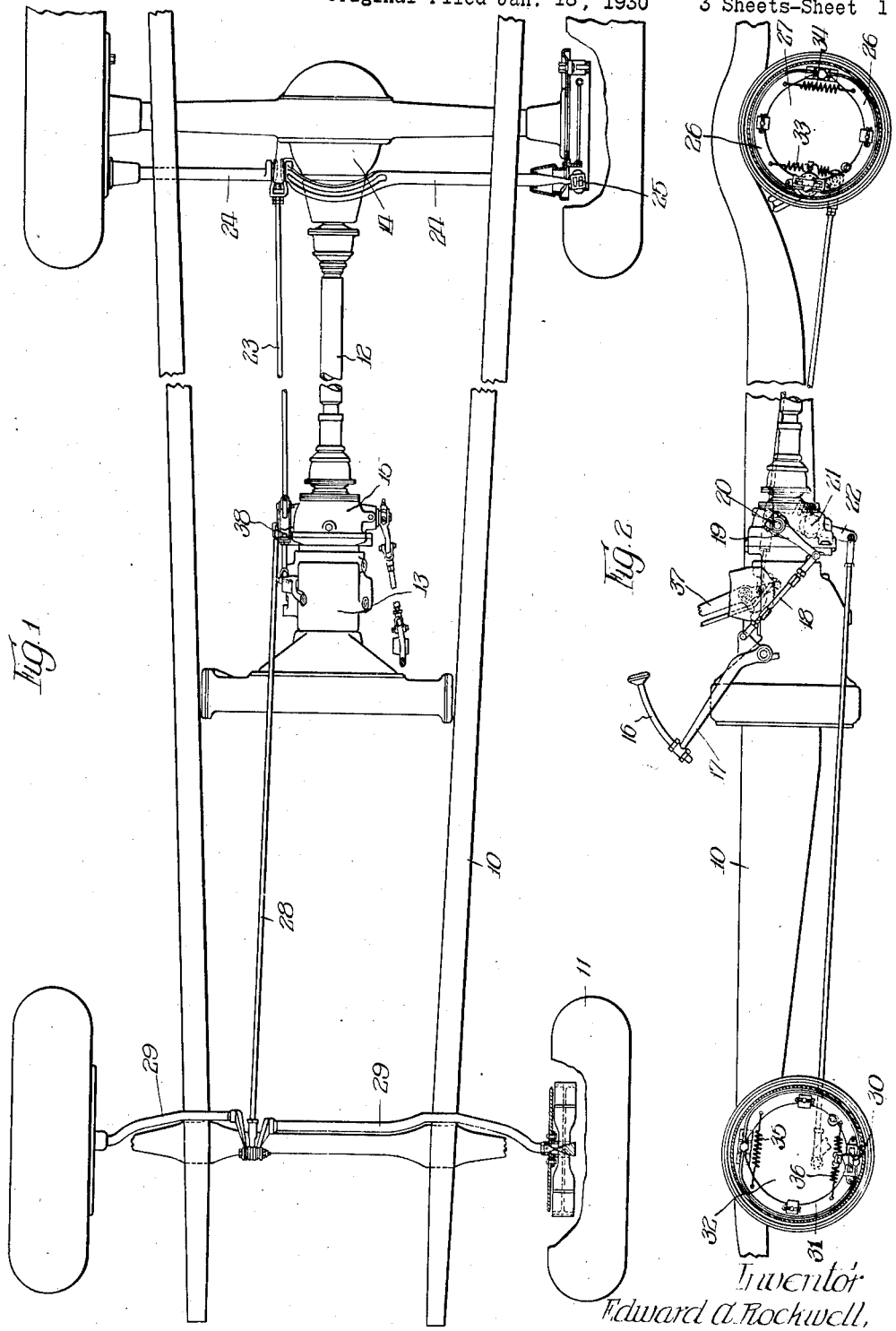
Inventor
Edward A. Rockwell,

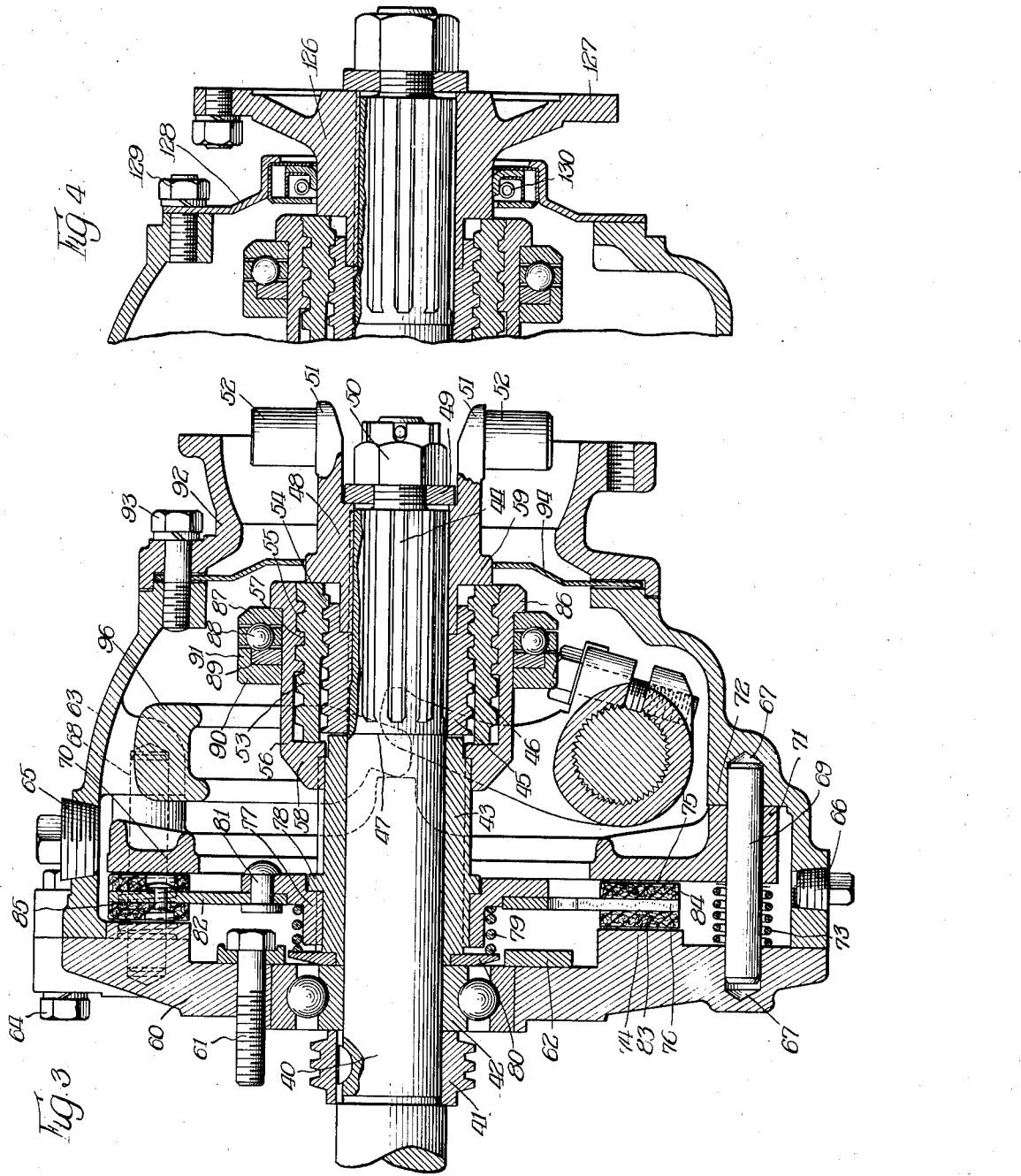

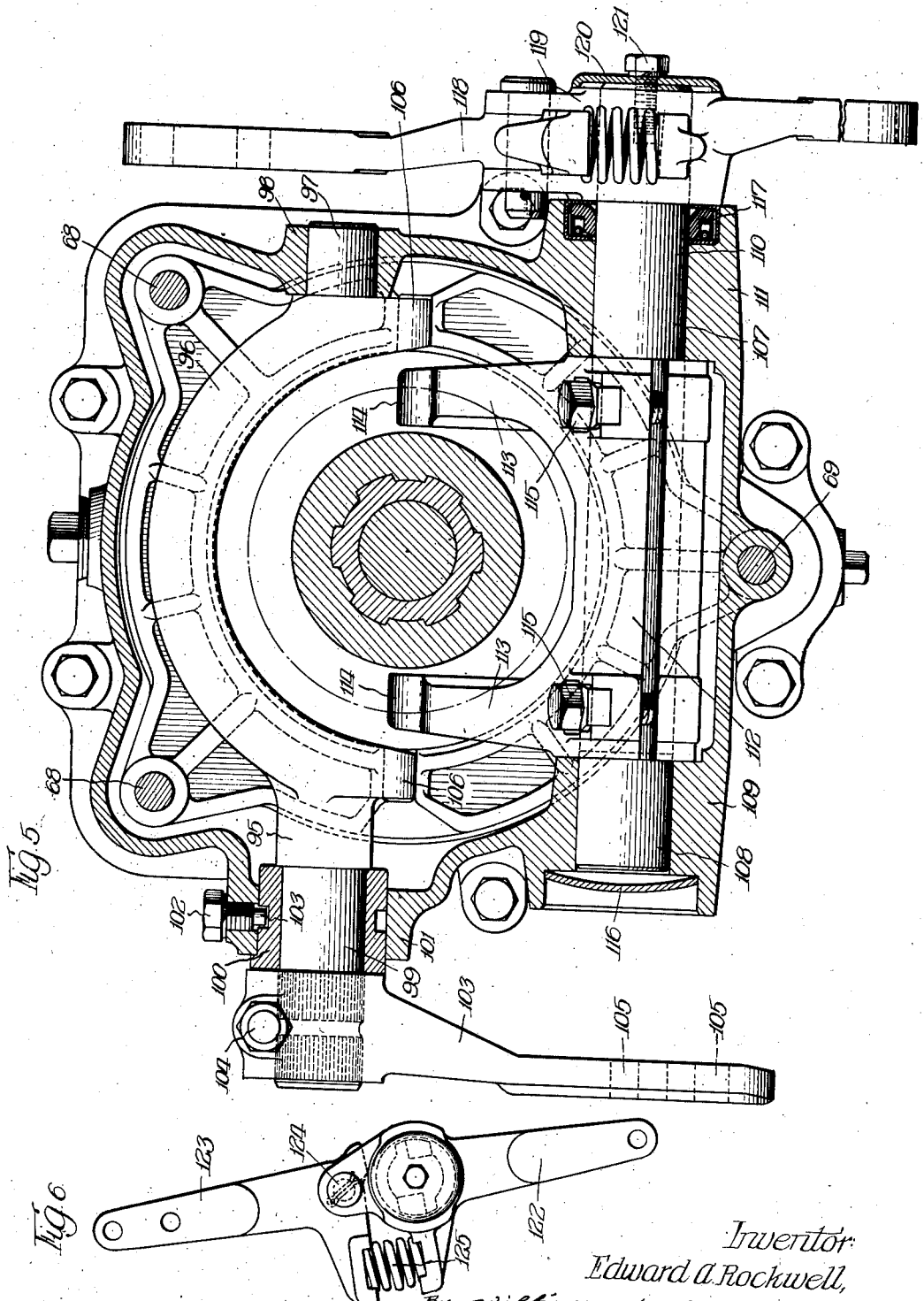

Patented Apr. 10, 1934

1,953,989

UNITED STATES PATENT OFFICE 1,953,989

INCLOSED DISK-TYPE POWER BRAKE UNIT

Edward A. Rockwell, Chicago, Ill.

Application January 18, 1930, Serial No. 421,707
Renewed July 28, 1933

7 Claims. (Cl. 188—140)

This invention relates to improvements in power brake mechanisms, especially applicable for use in connection with motor vehicles so arranged that the operator may selectively control the actuation of the power brake by relatively light pedal pressure and the actuation of the power brake through the movement of the vehicle and the rotation of the propeller shaft serves to bring into action the vehicle wheel brakes to retard the travel of the vehicle.

Power brakes of the type to which the present improvements relate have been heretofore proposed and include an element having a frictional gripping surface that is normally rotatable with the vehicle propeller shaft but is so coupled to the shaft that by applying a retarding force to the element a relative rotation between the element and the shaft takes place. Thus the normally rotatable element is maintained in its normal position of rotation with respect to the shaft by the resistance to movement of the linkage connected to the vehicle wheel brakes. The relative rotation between the element and the shaft causes the brake linkage to be moved and transmits a braking force distributed to the wheel brakes. According to a previous construction the brake element is coupled to the shaft through spiral sleeves, which are so arranged that one of the sleeves will be axially displaced with respect to the shaft upon a relative rotation between the brake element and the shaft. The movement of the actuating sleeve causes the rotation of the output rock shaft. The spiral sleeves are so constructed that movement of the output rock shaft will occur in the same direction regardless of the direction of rotation of the brake elements and therefore the operation will take place in a similar manner when the vehicle is moving in reverse as well as a forward direction.

In the previous construction a housing was provided adapted to be mounted in rear of the transmission housing and serving to inclose the spiral sleeves and the output rock shaft whereby the parts could be lubricated by the oil from the transmission housing flowing into the power brake housing, but the normally rotatable but retardable brake element comprised a drum mounted outside of the oil sealed housing on the end of the propeller shaft adjacent the universal joint connection. Brake shoes were mounted on fixed anchor points and designed to be moved into engagement with the inner surface of the brake drum. Since the brake drum in the previous construction was intended to rotate at propeller shaft speeds, it was found desirable to utilize a dash pot associated with the output rock shaft in order to absorb shocks and vibrations which might be transmitted to the vehicle wheel brakes and to give a smooth and efficient braking action.

A power brake of the described type acts to some extent as an additional brake and assists in retarding the movement of the rear wheels of the vehicle, but in order to utilize the momentum of the vehicle to the greatest extent and to smoothly retard the travel of the vehicle by applying a braking force to all four wheels of the vehicle, it is desirable that the percentage of braking performed by the power brake be relatively small. Thus the power brake should do the greater portion of its work by amplifying the pedal pressure of the operator and distributing the amplified braking force to the wheel brakes. This amplified action of the power brake takes place without any self-energizing effect, that is, the rotation of the power brake element does not in itself assist in producing a braking force, and therefore the operator can carefully control the wheel brake pressures by the relatively light pedal pressure applied.

It is the purpose of the present invention to provide a construction of a power brake which is relatively more simple in construction, that can be manufactured substantially in standard parts and may therefore be readily installed with a minimum of special parts on different standard designs of motor vehicles.

It is further a purpose of the present invention to provide a construction of power brake which will have a smooth and efficient action and in which the frictional gripping surfaces of the power brake, instead of being dry and outside of the housing, run in oil within the housing. Thus a preferred construction consists in using as the normally rotatable but retardable brake element a disk-shaped member, having annular friction rings running in oil within the power brake housing and mounted to be forced into engagement selectively by the operator with non-rotatable frictional retarding surfaces. The disk type is less expensive than the previously used brake drum with internally expanding shoes and will give a smoother and more efficient amplifying action. Due to the use of the lubricated frictional retarding surfaces less work is done by the power brake in acting as a fifth brake, and therefore the momentum of the vehicle may be used to a greater extent in amplifying the braking force, which is transmitted to the wheel brakes. In a preferred construction the disk-shaped brake element is mounted as close as possible to the transmission housing of the vehicle, thus placing the rotating mass of metal closer to the ball bearing support of the propeller shaft. The vibration and shocks occasioned by the power brake are therefore reduced to a minimum. The relative rotation between the power brake element and the propeller shaft may be utilized in any desirable manner to cause the displacement of an output actuating sleeve. If a relatively short travel is desired, camming surfaces may be employed, but in order to obtain a longer travel it is more desirable that spiral sleeves be employed as in previous designs.

Another feature of the invention consists in the provision of a power brake completely inclosed in an oil housing whereby the heat generated by the friction is rapidly dissipated through the cast iron non-rotatable braking members and the housing.

Further objects and advantages and improvements in detail of the construction will be more readily apparent as the invention is more fully described in connection with the attached drawings, in which several forms and embodiments of the invention are disclosed.

In the drawings:

Figure 1 is a plan view substantially diagrammatic of a chassis layout, showing the brake linkage in connection with the power brake unit;

Figure 2 is a side elevation of the brake linkage and the power brake unit illustrated in Figure 1, and further showing the internal construction of the wheel brakes;

Figure 3 is a vertical longitudinal section taken through the power brake housing and illustrating the internal construction. In this form the casing is adapted to be connected to a torque tube.

Figure 4 is a partial vertical section similar to Figure 3, but illustrating the interchangeable Hotchkiss drive connection;

Figure 5 is a vertical section taken transversely through the power brake casing and illustrating the arrangements of the rock shafts;

Figure 6 is a side view of the double armed output lever device;

The chassis layout as illustrated in Figures 1 and 2 will be first described in order that the manner by which the operation of the power brake pulls on the wheel brakes will be clearly apparent. In these figures 10 is a chassis frame and the wheels of the vehicle are indicated at 11. A propeller drive shaft 12 is shown rearwardly extending from the transmission housing 13 to the differential 14. The power brake casing 15 is arranged immediately in rear of the transmission housing and incloses the operating parts of the power brake unit. A pedal 16 is carried by a pivoted lever 17 and is suitably connected through linkage 18 to an input lever arm 19 secured to the input rock shaft 20. Movement of the pedal 16 will therefore serve to bring the power brake into action. It will be understood that as the braking members within the power brake casing are moved into engagement by the movement of the pedal, the momentum of the vehicle, through the rotation of the propeller shaft, will cause the input force to be amplified in effectuating a turning movement of the output rock shaft 21, which has suitably connected to an outwardly extending end a double armed lever 22. The upper arm of the lever 22 connects to the brake rod 23 which extends to operate the rear brake shafts 24, carrying at their ends cams 25 for expanding the internal shoes 26 of the rear wheel brakes denoted generally 27. The lower arm of the lever 22 similarly connects to a forwardly extending brake rod 28 connected to the forward cross shafts 29 which carry cams 30 for expanding the shoes 31 of the front wheel brakes denoted generally 32. Pull back springs 33 and 34 are provided at the rear wheel brakes and pull back springs 35 and 36 are provided at the front wheel brakes for holding the brake linkage normally in released position. An emergency lever 37 is illustrated, having a lost motion connection 38 to the upper arm of the lever 22, whereby the wheel brakes may be brought into operation by movement of the emergency lever, without operation of the power brake unit.

The present improvements relate to the construction of the power brake unit itself and one specific form is illustrated in Figures 3 to 6 inclusive. Referring to these figures, the propeller shaft which rearwardly extends from the transmission of the vehicle is designated 40. A speedometer worm 41 is keyed to the shaft 40 within the transmission housing. A ball bearing unit 42 is placed adjacent the speedometer worm 41 and serves as a bearing for the shaft and receives a portion of the thrust occasioned by the operation of the power brake. In rear of the bearing 42 the shaft 40 is smooth and receives a supporting sleeve 43, which is rotatable with respect to the shaft 40. The rearward end of the shaft 40 is provided with splines 44 and receives thereon an inner sleeve member 45, having inner splines to be keyed to the shaft 40 and an exterior spiral thread 46. The sleeve 45 is forced into engagement with shoulder 47 of the shaft 40 and therefore does not bind the rotatable sleeve 43. The sleeve 45 is held in place by the drive connection 48, which comprises a sleeve member having internal splines fitting the splines 44 and secured in place by the washer 49 and nut 50 which screws onto the reduced end of the shaft 40. The drive connection 48 is formed with yoke arms 51 and pins 52 and comprises a part of a universal joint connection to the drive shaft which extends to the differential of the vehicle. Fitting onto the inner sleeve 45 is an intermediate sleeve 53, which has an internal spiral 54 meshing with the spiral on the exterior of the sleeve 45. The intermediate sleeve 53 has an exterior spiral thread 55 oppositely arranged with respect to the internal spiral. An outer actuating sleeve 56 fits over the intermediate sleeve and is provided with an internal spiral 57, engaging the exterior spiral of the sleeve 53. The outer sleeve 56 has at its forward end an inwardly extending shoulder 58, which overlaps the forward end of the sleeve 53 and is provided with keys fitting the splines of the supporting sleeve 43. The intermediate sleeve 53 abuts at its rearward end, when in normal inactive position, against a shoulder 59 of the drive connection 48.

Looking at the shaft 40 from the forward end, the rotation when the vehicle is traveling forward will be in a clockwise direction, and the co-operating spirals between the inner spiral sleeve 45 and the intermediate spiral sleeve 53 comprise right hand spirals, while the spirals between the intermediate sleeve 53 and the outer sleeve 56 comprise left hand spirals. It will therefore be apparent that a rotation of the shaft 40 in a clockwise direction will tend to move the intermediate spiral 53 to the left in Figure 2 and this will tend to carry with it the outer collar 56, but the axial displacement of the sleeve 56 is normally resisted by the pull back springs of the brake linkage, as will be later described, and therefore the sleeve 56 will not be moved and the supporting sleeve 43 will be rotated with the shaft 40. However, if the supporting sleeve 43 is retarded in its rotation, the outer sleeve 56 will be forced to move axially to the left in Figure 3 and transmit a braking force to the output connections.

The brake mechanism is inclosed in an oil sealed housing, such as will now be described. At the forward end an end plate 60 is designed to fit against the transmission housing with which the power brake is associated. The plate 60 has an opening to receive the ball bearing unit 42 and is held in place by the bolts 61, the heads of which also serve to secure the retainer ring 62 for the ball bearing. The intermediate portion of the housing comprises a casting 63 designed to seat against the end plate 60 and be secured thereto by the bolts 64. The casting 63 has a filling opening at the upper side closed by the plug 65 and a drain plug 66 at the lower side. The end plate 60 and the housing member 63 are formed with sockets 67 to receive three dowel pins, two of which are disposed at the upper side of the housing and indicated 68 in Figure 5, and the other of which is disposed at the bottom and indicated 69. The dowel pins form guiding means for a movable brake plate 70 which, as shown in Figure 3, is formed with bearings 71 for the dowel pins seating against the shoulder portions 72 of the housing 63, when in released position. The brake plate 70 is normally held in released position by the springs 73, which surround the dowel pins and bear between the end plate 60 and the brake plate 70. The end plate 60 is preferably of cast iron and has an inwardly facing friction surface 74, while the brake plate 70 similarly of cast iron, has a friction surface 75. The friction surfaces 74 and 75 are non-rotatable, but are movable relatively toward each other, as will be later described. Between the non-rotatable friction surfaces 74 and 75 a disk-shaped brake element denoted generally 76 is mounted to rotate.

The disk-shaped brake element 76 is keyed to the supporting sleeve 43 to rotate therewith. In the form shown in Figure 3 the brake element 76 includes an inner collar 77 having internal keys fitting the splines of the sleeve 43 and adapted to abut in stop position at its rearward end against the shoulder 78 of the sleeve 43. The brake element 76 is forced to its release position by the compression spring 79, which surrounds a portion of the collar 77 and seats against a retainer ring 80. The collar 77 has riveted thereto by the rivets 81 an annular plate 82, to the opposite sides of which are secured annular rings of friction material 83 and 84, fastened by rivets 85. The friction rings 83 and 84 are intended to cooperate with the non-rotatable friction surfaces 74 and 75. It will therefore be understood that when the brake plate 70 is moved to the left in Figure 3 the friction surface 75 will come into engagement with the friction ring 84 and tend to move the normally rotatable brake element 76 to the left against the resistance of the spring 79, thereby bringing the friction ring 83 into engagement with the friction surface 74. The frictional retardation applied to the brake element 76 will cause a relative rotation between the brake element 76 and the shaft 40 and thereby effectuate an axial displacement of the collar 56. The collar 56 has a rearward shoulder 86 against which is seated the thrust ring 87. A thrust bearing 88 is received on the collar 56 and bears against the thrust ring 87. At the forward end an inner thrust ring 89 of relatively hard material bears against the thrust bearing 88 and is received within a ring 90 of relatively softer material, which has a flange 91 overlapping the inner thrust ring 89.

The housing 63 is formed with a wide rear opening adapted to be closed in the form shown in Figure 3 by a cap member 92, forming a portion of a torque tube connection. The cap 92 is secured by the bolts 93 which are threaded into the housing member 63. The co-operating flanges of the cap 92 and the housing member 63 retain therebetween a flat splash plate 94, which extends closely adjacent the drive connection 40 and serves to retain the lubricant within the power brake housing should the vehicle be tilted from the horizontal.

The interchangeable cap 92 can be formed to fit any torque tube drive or may serve to inclose any universal joint connection when a completely inclosed drive is desired. An input rock shaft 95 is disposed transversely to the propeller shaft 40 and mounted in bearings of the housing 63 in the manner illustrated in Figure 5. The rock shaft 95 includes within the housing an upwardly curved portion 96 to extend over the shaft 40 and the actuating parts thereon. The right hand end of the rock shaft 95, as in Figure 5, has a cylindrical stud 97 received in a bearing 98 of the housing 63, while the left hand end has a cylindrical bearing portion 99 seating in a removable bushing 100, held in a bearing 101 of the casting 63 by the securing bolt 102. The bolt 102 has an inner stud 103 engaging an annular depression in the bushing 100. The end 99 of the rock shaft 95, which extends outside of the housing 63, is serrated as illustrated in Figure 5 and has secured thereto the depending input lever arm 103, fastened by the bolt 104. The lever arm 103 has a plurality of openings 105 for connection of the linkage from the pedal in order to adjust for the proper leverage. The rock shaft 95 within the housing includes depending thrust arms 106, having ends disposed substantially at the horizontal center line and designed to come into thrust engagement with the movable brake plate 70 when the rock shaft 95 is rotated.

Also shown in Figure 5 is a lower transverse output rock shaft 107. The left hand end 108 of the rock shaft 107 is received in a bearing 109 of the casing 63, while the right hand end 110 is received in a bearing 111 of the casing 63. Within the housing the rock shaft 107 has mounted thereon a yoke member 112, which has upwardly extending thrust arms 113 extending to end portions 114 substantially at the horizontal center line and designed to bear in thrust relation against the thrust member 90, mounted on the collar 56. The yoke member 112 has a split sleeve fitting onto the serrated shaft 107 and secured by the screw bolts 115. The right hand end of the bearing 109 in the housing 63, which is open in order that the output may be taken from either side of the housing, may be closed by the sealing cap 116, while the bearing 111 on the opposite side receives an oil seal unit 117, which serves to prevent leakage of oil from the housing. Upon the outwardly extending end 110 of the rock shaft 107 is mounted a double arm lever denoted generally 118, which has a hub 119 held by the circular plate 120 and the screw bolt 121.

The construction of the double arm distributing lever 118 need not be described in detail in this application, since the subject-matter is covered by claims in a co-pending application, but it will be understood that the entire double arm lever has a lost motion connection with the rock shaft 107, in order that it may be operated by the emergency lever without movement of the rock shaft 107. It will be further understood that the construction comprises a lower lever arm 122, which carries an upper lever arm 123 by the pivot 124. The lever arms 122 and 123 are retained in normal position by the relatively stiff spring 125. Operation of the output rock shaft 107 will tend to turn the distributing lever and transmit a braking force to the front and rear wheel brakes, and when the rear wheel brakes offer sufficient resistance the stiff spring 125 will yield and further braking may be done at the front wheel brakes by a movement of the lower lever arm 122, while the upper lever arm 123 remains stationary.

Figure 4 illustrates a modification in which the power brake unit is associated with a Hotchkiss drive instead of a torque tube and in this construction a flanged drive collar 126 takes the place of the drive connection 48 shown in Figure 3. The collar 126 is formed with a drive flange 127. In order to close the housing 63 an annular retaining ring 128 is bolted to the housing by the screw bolts 129 and serves to retain an oil seal unit 130 surrounding the drive collar 126. It will be apparent that by the construction of the parts I have described it is comparatively easy to adapt the power brake unit either to a torque tube or a Hotchkiss drive. The end plate 60 is designed to fit the particular transmission housing of the vehicle with which the power brake is associated and may in some cases be made integral with the transmission housing. The housing 63 and the internal parts are standard for all sizes and types and it is only necessary to use a drive connection and closure to fit the particular form of drive. The rear opening of the casing 63 permits the assembly of the spiral sleeves after the casing 63 is bolted in place.

The power brake does not become over heated since the heat is rapidly dissipated through the cast iron part to the housing and the oil assists in cooling.

Various modifications and changes may be resorted to without departing from the spirit of the invention as expressed in the appended claims.

I claim:

1. In a power brake construction, a drive shaft, a supporting sleeve mounted on but rotatable with respect to said drive shaft, a disk-shaped brake element carried by said sleeve and axially splined thereto, yieldable coupling means including an axially displaceable sleeve between said supporting sleeve and said shaft, said coupling means including inclined surfaces normally causing said brake element to rotate with said shaft but permitting a relative rotation between said brake element and said shaft by movement of the axially displaceable sleeve, means for retarding the rotation of said brake element and output means moved by the displacement of said sleeve.

2. In a power brake construction, a drive shaft, a disk-shaped brake element normally rotatable with but retardable with respect to said drive shaft, a fixed brake plate on one side of said disk-shaped element and a movable brake plate on the other side of said disk-shaped brake element, means causing said disk-shaped brake element to be moved in engagement with the brake elements on opposite sides thereof and output means moved by the relative rotation between said disk-shaped brake element and said shaft.

3. A power brake construction for motor vehicles comprising a propeller shaft extending from the transmission housing, a supporting sleeve mounted on said propeller shaft and rotatable with respect thereto, a disk-shaped brake element carried by said supporting sleeve and splined for axial displacement with respect thereto, a non-rotatable brake plate on one side of said disk-shaped member, a non-rotatable brake plate on the other side of said disk-shaped member, one of said non-rotatable brake plates being mounted to be movable into engagement with said disk-shaped member to cause said disk-shaped member to be axially displaced and forced into engagement with the other of said non-rotatable brake plates, yieldable coupling means between said supporting sleeve and said drive shaft and output means moved by the relative rotation between said disk-shaped brake element and said shaft.

4. In a power brake construction a vehicle propeller shaft, a supporting sleeve carried by said shaft and retained against axial movement, said sleeve being free to rotate with respect to said shaft, a brake element non-rotatably secured to said supporting sleeve but axially slidable with respect thereto, an exteriorly spiraled inner sleeve non-rotatably secured to said drive shaft adjacent said first mentioned sleeve, an outer actuating sleeve having an interior spiral and slidably splined to said supporting sleeve, an intermediate sleeve oppositely spiraled to said inner and outer sleeves, whereby said brake element is normally yieldably driven from said shaft through said spiral sleeves, means for retarding the rotation of said brake element and output means actuated by the displacement of said outer spiraled sleeve.

5. In a power brake construction for motor vehicles, a propeller shaft rearwardly extending from the transmission of the vehicle, a fixed housing surrounding said propeller shaft, said housing having an opening at its rear end through which the end of said propeller shaft protrudes, a disk-shaped braking element within said housing concentric with said propeller shaft, yieldable coupling means within said housing between the propeller shaft and said braking element, including axially displaceable spiral sleeves, input means supported by said housing operating to produce retardation of said braking element, output means supported by said housing operated upon retardation of said element through axial displacement of one of said sleeves, a drive sleeve keyed to the protruding end of said propeller shaft, said drive sleeve forming an abutment for the rear end of one of said spiral sleeves.

6. In a power brake construction, a casing, a drive shaft extending through said casing, a friction disk mounted on said shaft within said casing, said disk being normally rotatable with but retardable with respect to said drive shaft, said casing having a friction surface adapted to cooperate in frictional engagement with one side of said friction disk, a movable pressure plate in said casing mounted for frictional cooperation with the opposite side of said friction disk, pins for supporting and guiding said pressure plate for movement relative to said casing, input means for actuating said pressure plate to produce retardation of said disk and output means actuated by the relative rotation between said disk and said shaft.

7. In a power brake construction, a casing, a drive shaft extending through said casing, a friction disk mounted on said shaft within said casing, said disk being normally rotatable with but retardable with respect to said shaft, said casing having a friction surface adapted for frictional cooperation with one side of said friction disk, a pressure plate mounted in said casing for movement into frictional engagement with the other side of said friction disk, resilient means between said casing and said pressure plate for normally holding said pressure plate in inoperative position, input means for moving said pressure plate towards said friction disk to cause frictional retardation thereof with respect to said shaft and output means actuated by the relative rotation between said disk and said shaft.

EDWARD A. ROCKWELL.